3,658,712
AQUEOUS SUSPENSIONS CONTAINING SODIUM PERBORATE

Kurt Lindner, deceased, late of Berlin, Germany, by Kathe Lindner, nee Arnold, and Joachim Ebrecht, heirs, Berlin, and Elfriede Eichler, Berlin, Germany, assignors to Henkel & Cie GmbH, Dusseldorf, Germany
No Drawing. Continuation-in-part of application Ser. No. 641,466, May 26, 1967. This application Jan. 19, 1971, Ser. No. 107,820
Claims priority, application Germany, June 8, 1966, H 59,620
Int. Cl. C11d 7/58
U.S. Cl. 252—99      20 Claims

ABSTRACT OF THE DISCLOSURE

Storage stable aqueous suspensions of solid sodium perborate constituting thick liquids or pastes are disclosed in which the aqueous phase has a pH of from 3 to 11 and contains in addition to the perborate a non-oxidizable vinyl polymer containing carboxyl groups. The polymer is characterized in that a 1% aqueous solution of the polymer in the form of its sodium salt has a viscosity of at least 5000 cp. at a pH of 7 and a temperature of 20° C. The suspensions constitute oxidizing and bleaching agents and are characterized by their outstanding physical and chemical stability.

---

This application is a continuation-in-part of Ser. No. 641,466, filed May 26, 1967, now abandoned.

The present invention relates to aqueous suspensions containing sodium perborate characterized by both chemical and physical stability. More particularly, this invention relates to storage stable thick liquid or pasty suspensions of solid perborate in an aqueous phase which can be used as liquid oxidizing or bleaching agents.

Commercial sodium perborate of the formula $$NaBO_2 \cdot H_2O_2 \cdot 3H_2O$$

is an oxidizing and bleaching agent which is used in many applications. When dissolved in water sodium perborate breaks down into sodium metaborate and hydrogen peroxide, thus combining the action of the oxygen-yielding hydrogen peroxide with that of the alkalinely reacting metaborate. Because of the poor solubility of sodium perborate in water, which amounts to about 1.34 grams per 100 ml. at 15° C., it is not possible, as it is with hydrogen peroxide, to prepare solutions of sodium perborate in sufficiently high concentrations as to permit their economical use. As a result, sodium perborate has heretofore been used in solid form, either alone or in combination with the powdered, granulated or hollow bead products of the prior art, which are then used as oxidizing agents, bleaches, detergents, cleansers or disinfectants.

It is an object of the present invention to provide aqueous suspensions containing solid sodium perborate which are suitable for use as liquid oxidizing and bleaching agents.

A further object of the invention is to provide aqueous suspensions containing solid sodium perboate in which the suspended sodium perborate remains in suspension over prolonged periods.

Another object of the invention is to provide aqueous suspensions containing solid sodium perborate in which the suspended sodium perborate remains in suspension over prolonged periods and the active oxygen loss is greatly decreased whereby the preparations can be stored for long periods without any appreciable variation in their consistency or oxidizing power.

Other objects and various further features of novelty and invention will be pointed out or will occur to those skilled in the art from a reading of the following specification.

In accordance with the invention it has been found that storage stable aqueous suspensions of solid sodium perborate are obtained by incorporating into the aqueous phase having a pH of 3 to 11, a non-oxidizable vinyl polymer containing carboxyl groups having quite special properties and namely a degree of polymerization and cross linking such that a 1% solution of the sodium salt, which solution is substantially free of other dissolved substances has a viscosity, at a pH of 7 and a temperature of 20° C. of at least 5000 cp. and preferably of 7000 to 100,000 cp.

Water-soluble salts of polymeric carboxylic acids and particularly of polyacrylic and polymethacrylic acid, have long ago been proposed for use as thickening agents for aqueous solutions. It is to be considered remarkable that these substances, which are substantially uncrosslinked linear polymers and whose aqueous solutions in the same concentrations have a substantially lower viscosity than that of the non-oxidizable polymers containing carboxyl groups which are to be used according to the invention, do not have the property of making possible the preparation of aqueous suspensions of sodium perborate with stabilized active oxygen.

The polymers containing carboxyl groups as used in accordance with the invention can be obtained by the polymerization of $\alpha,\beta$-unsaturated monocarboxylic acids having 3 to 5 carbon atoms. Acrylic acid, methacrylic acid, $\alpha$-chloroacrylic acid and $\alpha$-cyanacrylic acid are preferably employed as monomers. The polymerization of the monomeric compounds takes place in the presence of 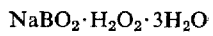 small amounts of crosslinking agents, i.e. of polymerizable substances having at least two terminal olefin groups. These include many different hydrocarbons, esters, ethers or amides, such as divinyl benzene, divinyl naphthaline, polybutadiene, ethylene glycol diacrylate, methylene-bis-acrylamide, allyl acrylate, alkenyl ethers of sugars or sugar alcohols, acid anhydrides, etc. The polymerization can be carried out under conditions in which the free carboxyl groups form anhydrides. These anhydride groups are again split in the manufacture of the suspensions according to the invention.

In the polymerization process, the crosslinking produces a considerable increase in the molecular weight of the polymerization products. The crosslinking, however, may progress only to the point where the polymers are completely water soluble in the form of their alkali salts and the viscosity of the 1% aqueous solution of the sodium salts falls within the claimed range. The viscosities apply to solutions of the polymers in distilled water, i.e., without the addition of other soluble substances, as otherwise the viscosities of the solutions might be affected. The measurements are carreid out in a Brookfield viscosimeter.

Water soluble carboxyl group containing vinyl polymers suitable for use in the practice of the invention are disclosed in U.S. Pat. 2,798,053. A commercially available embodiment of the polymer is Carbopol 934, which is described in Chemical Products, December 1959, pages 459–460.

The suspensions can contain, in addition to the perborate, further materials which are capable of supporting the action of the perborate in the particular oxidizing, bleaching, washing, cleaning or disinfecting process involved. Such materials may be inorganic or substantially non-oxidizable organic, dissolved, emulsified or suspended materials.

The inorganic substances which may be present partially in the undissolved state are preferably the acid, neutral or alkalinely reacting sodium salts of the acids of phosphorus, which are often used in detergents and cleaning agents, such as the salts of orthophosphoric acid, and particularly the sodium salts of condensed phosphoric acids, such as of pyrophosphoric acid or tripolyphosphoric acid. However, the sodium salts of other condensed phosphoric acids can also be present, such as, for example, the sodium salts of metaphosphoric acid or the still water-soluble sodium salts of the higher, medium or long chain phosphoric acids. Illustrative of other adjuvants which can be present are sodium sulfate, sodium metasilicate and sodium polysilicate.

The stability of the active oxygen is also dependent upon the pH of the aqueous phase, which may range from 6 to 11 and preferably from 7 to 9 in the case of concentrates intended for washing and bleaching in the household and in certain industries. The acid, neutral or alkalinely reacting condensed phosphates, sodium carbonates, sodium silicates, trisodium orthophosphate, etc., which have been mentioned above can be used for the adjustment of the pH to the desired range, although the danger of oxygen losses increases with the alkalinity.

Many of the above-named inorganic additives are capable of binding water as water of crystallization. Therefore, either salts containing water of crystallization can be incorporated into the preparations according to the invention, or a corresponding amount of water has to be added when calcined salts are used.

The suspensions, i.e., dispersions, can be prepared by bringing together components in any desired order. It is advantageous first to mix together the solid components including the vinyl polymer containing carboxyl groups, and to make a paste of this mixture with water. However, an aqueous solution of a salt of the polymer can be prepared first, and the other components can be then incorporated into this solution. It is less advantageous to add the solid polymer as the last component to the solid components of the suspension after they have been already mixed with water.

In the manufacture of the suspensions according to the invention, starting materials will of course be used which are substantially free of catalysts which initiate or contribute to the decomposition of per compounds, and especially traces of heavy metals. However, it has been found advantageous to add known per compound stabilizers. These include the known stabilizers of the group of organic acids, such as tannic acid, citric acid, barbituric acid, ascorbic acid, or of the group of neutrally reacting compounds, such as acetophenetidine-acetanilide or 8-oxyquinoline. Polymeric phosphates, such as the previously mentioned tetrasodium pyrophosphate; or sodium polysilicates, have a stabilizing effect. Solid per compound stabilizers, such as magnesium silicate and components that can be used for the formation of preferably colloidal magnesium silicate can be incorporated. Lastly, certain surfactants are also characterized by a pronounced ability to stabilize the active oxygen of the sodium perborate.

In the interest of achieving the greatest possible suspension stability, it is advantageous to use the suspended solids in the most finely divided state possible or to convert them to that state. This can be done by grinding the starting materials, but it is also possible to homogenize the finished suspensions by working them in colloid mills or cylinder mills and by other such procedures, whereby the suspended particles are reduced to a very finely divided state.

The consistency of the suspensions depends both on the amount of suspended components contained therein and on the viscosity of the aqueous phase. If the adjuvants to be used together with the perborate are available substantially in a solid, undissolved state, the perborate can amount to from 5 to 90%, and preferably from 10 to 50% of the weight of the undissolved solids. In the case of liquid suspensions, the quantity of suspended solids can amount to as much as 50% of the weight of the total preparation, and in the case of pastes it can amount to as much as 75%. In practice, liquid suspensions will be preferred to pastes, because the former are easier to measure out and to distribute in aqueous treatment solutions.

Still other adjuvants can be present in the suspensions in addition to the substances mentioned above. Such additives which either improve the stability, especially the chemical stability, or which have an advantageous effect when the products are used as detergents, bleaches and oxidants are preferably included.

The surfactants which may be present in the concentrates of the invention are preferably products which are not oxidizable, i.e., which are free of olefinic double bonds or other oxidizable groups.

The structure of many of the surfactants that can be used according to the invention come within the general principle of a linking of a hydrophobic radical with a hydrophilic group in one molecule. Non-oxidizable surfactants having saturated radicals containing 8 to 24 and preferably 10 to 16 carbon atoms and having anionic or non-ionic hydrophilic groups have been found suitable for use in the invention. The saturated hydrophobic radicals are preferably of an aliphatic nature. They can be derived from fatty acids or fatty alcohols.

The anionic surfactants of a mainly saturated character include, for example, alkyl sulfates or alkyl ether sulfates which are obtained, for example, from products formed by addition of ethylene oxide and/or propylene oxide to fatty alcohols, alkyl sulfonates, alkyl aryl sulfonates and products of the condensation of fatty acids with hydroxy carboxylic acids, hydroxy sulfonic acids, aminocarboxylic acids and aminosulfonic acids. In these anionic surfactants, the alkyl or acyl radical contains preferably 10 to 16 carbon atoms.

The non-ionic surfactants include, for example, the products of the addition of ethylene oxide or ethylene oxide and propylene oxide to fatty alcohols, fatty acids, alkyl phenols, fatty acid amides, fatty acid alkylolamides and other such non-oxidizable compounds containing reactive hydrogen. The number of ethylene glycol radicals present in the molecule can vary between 4 and 20 and preferably between 5 and 15, and should suffice to give the products turbidity points of at least 20° C. and preferably of at least 40° C.

For the purposes of the invention another group of non-ionic surfactants can be used, which differs from those described hitherto in the nature of the hydrophobic radical, and by the presence of a plurality of hydrophilic groups in one molecule. These are block polymers which are obtained by the addition of ethylene oxide to water-insoluble polypropylene glycols of high molecular weight or to water-insoluble products of high molecular weight formed by the reaction of propylene oxide and diamines. These last-named surfactants are described in detail in the literature, cf. K. Lindner, "Tenside, Textilhilfsmittel, Washchrohstoffe," 2nd ed., Stuttgart, 1964, pp. 1052–1056.

The non-ionic surfactants include aminoxides of high molecular weight.

Of the aforesaid surfactants preference is given to those which are the most salt resistant and which also stabilize the active oxygen of the sodium perborate.

It is not always necessary that the surfactants dissolve in the aqueous phase of the sodium perborate suspension, for they can also be in suspended or emulsified form. Also, one part of the surfactant can be in solution and another part remain undissolved.

Many of the above-listed surfactants have a pronounced sudsing ability, which can be augmented or diminished by combining different surfactants. In like manner, foam stabilizers or foam inhibitors can be added.

The additional use of non-oxidizable or poorly oxidizable hydrotropic substances is often advantageous, Cyanamide, dicyanamide or urea, and lower aryl or alkylaryl sulfonates, such as the water-soluble salts of benzenesulfonic, toluenesulfonic or xylenesulfonic acid, can be used as such substances.

The suspensions according to the invention are usable for a large number of bleaching and oxidizing purposes. In particular, they can serve as detergents and cleaning agents in textile finishing, in the laundry industry and in the household. But they are also of utility in the cosmetic field for the treatment of the hair and skin. Other applications include many different hygienic uses, especially disinfection or sterilization, and the passivation of aluminum and light metal surfaces, etching, etc.

In addition, other additives customarily used in the various applications may be present, such as germicides or fungicides, anticorrosives, optical bleaches, perfumes and dyes, etc.

The nature of the invention will be readily evident from the following examples which are to be considered exemplary and not limiting as regards the breadth of the invention.

A slightly cross-linked, non-oxidizable vinyl polymer containing carboxyl groups and available in the form of the free acid, having an acid number of 754, was used in the preparation of the suspensions described in the examples. In order to determine the viscosity of a 1% aqueous solution of the sodium salt of the polymer, a corresponding amount of the free acid was steeped in distilled water, thereafter somewhat less than the amount of dilute caustic soda solution required for neutralization was added and the mixture obtained was stirred occasionally until the polymer had dissolved. The polymer solution was adjusted to a pH of 7 by the addition of additional caustic soda solution. (In preparing the polymer solutions it is advantageous to check the pH after about 30 minutes of standing; if it has decreased, lye is added and the pH determination repeated after 30 minutes.) The aqueous solution which is thusly obtained had a viscosity of about 50,000 cp. measured at 20° C. in the Brookfield "RVT" rotation viscosimeter using a No. 6 spindle.

Distilled water was used for the production of the thickly liquid susepnsions described in the examples. The other components were available in standard technical grade. The term "perborate" as used herein is to be taken to mean a commercial, finely crystalline sodium perborate of the approximate composition $NaBO_2 \cdot H_2O_2 \cdot 3H_2O$. The other inorganic salts named in the examples are used in the calcined state. The quantity data given for the surfactants refer to 100% active substance.

Unless otherwise expressly stated, the indicated amount of water was gradually added to the mixture of the solid components, whereupon the polymer, after first passing through a swelling state, passes into solution and the suspension is formed after a period of stirring. In other cases a portion of the components were dissolved in water and then mixed with the rest of the components which were in the form of a solid mixture. In such cases it is stated which components were in the solid mixture and which were in the solution.

The pH values of the suspensions which are set out in the examples were determined by electrometer. In some instances the pH of a 1% solution of the suspension in distilled water was measured; these pH values are given in parentheses. It has been established that the pH of the suspension is generally substantially lower than the pH of the aqueous solution.

In order to determine the stability of the suspensions on standing, the suspensions obtained were stored in polyethylene bottles at about 20° C. The loss of active oxygen refers to the active oxygen content immediately after the suspension is prepared, which is taken to be 100%. After the stated storage time, all of the suspensions were still capable of flowing. Any sediment that was present could easily be redistributed.

All percentages recited in the examples are percentages by weight.

EXAMPLE 1
Composition

| | Percent |
|---|---|
| Perborate | 30 |
| Polymer containing carboxyl groups (see description in col. 5) | 1 |
| Water | 69 | ph: 8.36
Active oxygen loss after 3 weeks: 3.4%

EXAMPLE 2
Composition

| | Percent |
|---|---|
| Perborate | 20 |
| $Na_4P_2O_7$ | 10 |
| Polymer as in Example 1 | 1 |
| Water | 69 | pH: 8.1 (9.9)
Active oxygen loss after 8 weeks: 2.9%

EXAMPLE 3
Composition

| | Percent |
|---|---|
| Perborate | 20 |
| $Na_5P_3O_{10}$ | 10 |
| Polymer as in Example 1 | 1 |
| Water | 69 | pH: 7.9 (9.6)
Active oxygen loss after 8 weeks: 3.9%

EXAMPLE 4
Composition

| | Percent |
|---|---|
| Perborate | 20.0 |
| $Na_4P_2O_7$ | 3.4 |
| $Na_5P_3O_{10}$ | 6.6 |
| Same polymer as in Example 1 | 1.0 |
| Water | 69.0 | pH: 8.0 (9.7)
Active oxygen loss after 3 weeks: 3.1%

EXAMPLE 5
Composition

| | Percent |
|---|---|
| Perborate | 20 |
| $Na_2SO_4$ | 10 |
| Same polymer as in Example 1 | 1 |
| Water | 69 | pH: 7.4 (9.8)
Active oxygen loss after 3 weeks: 4.6%

EXAMPLE 6
Composition

| | Percent |
|---|---|
| Solid mixture: | |
| Perborate | 20 |
| Polymer as in Example 1 | 1 |
| Solution: | |
| $Na_2CO_3$ | 10 |
| Water | 69 | pH: 10.1 (10.7)
Active oxygen loss after 1 week: 7.7%

EXAMPLE 7
Composition

| | Percent |
|---|---|
| Suspension: | |
| Perborate | 20 |
| $Na_5P_3O_{10}$ | 10 |
| Same polymer as in Example 1 | 1 |
| Water | 39 |
| Added in form of a solution: | |
| 10% of a product formed by adding 13 moles of ethylene oxide to 1 mole of nonyl phenol. | |
| Water | 20 | pH: 7.8 (9.8)
Active oxygen loss after 3 weeks: 2%

If distilled water containing 0.1% acetophenetidine was used in preparing the suspension, the active oxygen loss was reduced to 1%.

EXAMPLE 8

The $Na_5P_3O_{10}$ in the concentrate of Example 7 was replaced by $Na_4P_2O_7$ and a suspension was obtained having a pH of 8.0 (9.8). The active oxygen loss after 3 weeks amounted to 0.9%. If distilled water containing 0.1 acetophenetidine was used for preparing the suspension, the active oxygen loss then amounted to only 0.4%.

EXAMPLE 9

Composition

| Suspension: | Percent |
|---|---|
| Perborate | 20 |
| $Na_5P_3O_{10}$ | 10 |
| Polymer as in Example 1 | 1 |
| Water | 39 |
| Added in solution form: | |
| Dodecyl dimethyl aminoxide | 10 |
| Water | 20 | pH: 7.7 (9.8)
Active oxygen loss after 5 weeks: 1.2%

EXAMPLE 10

Composition

| Suspension: | Percent |
|---|---|
| Perborate | 20 |
| $Na_5P_3O_{10}$ | 10 |
| Same polymer as in Example 1 | 1 |
| Water | 33.3 |
| Added in form of a solution: | |
| 10% of the sodium salt of an alkyl ether sulfate. | |
| Water | 25.7 | pH: 7.8 (9.8)
Active oxygen loss after 6 weeks: 1.9%

The alkyl ether sulfate was obtained by sulfatizing a product of the addition of 2.5 moles of ethylene oxide to coconut fatty alcohols.

EXAMPLE 11

Composition

| Suspension: | Percent |
|---|---|
| Perborate | 20 |
| $Na_4P_2O_7$ | 10 |
| Same polymer as Example 1 | 1 |
| Water | 39 |
| Used in form of a solution: | |
| 10% of the sodium salt of an alkylbenzenesulfonate having 12 carbon atoms in the alkyl radical. | |
| Water | 20 | pH: 8.0 (9.8)
Acitve oxygen loss after 6 weeks: 3.0%

Similar results were obtained when the above-described polymer was replaced by other non-oxidizing vinyl polymers containing carboxyl groups and having viscosities within the limits initially defined.

Using the methods described in the examples, pasty concentrates were also produced either by increasing the amount of the above-defined vinyl polymer containing carboxyl groups to 1.5 to 3%, or by raising the amount of suspended salts, and particularly the perborate, to 75%. In the case of suspensions containing surfactants, an increase of viscosity could be achieved up to a pasty consistency by varying the concentration and type of the surfactant. For example, anionic surfactants having 16 to 18 carbon atoms in the alkyl chain, when used in quantities of 5 to 10% of the total concentrate, resulted in pastes.

In the technical manufacture of the suspensions described, it is not necessary to use distilled water or water that has been otherwise freed of dissociatable substances. Perfectly satisfactory products can be prepared using ordinary water as long as it does not contain any decomposition catalysts for per compounds, or if any decomposition catalysts which might be present as impurities in the water or other starting materials have been bound in an appropriate manner, e.g., by non-oxidizable complex compound formers.

What is claimed is:

1. Storage stable aqueous suspension of solids including sodium perborate suitable for use as a bleach and oxidant wherein the suspended solids amount to from 5 to 50% of the weight of the total suspension, consisting essentially of suspended solid sodium perborate, water and a water-soluble carboxyl group containing vinyl polymer, the 1% aqueous sodium salt solution of which, when substantially free of other dissolved materials, has a viscosity of at least 5000 cp. at a pH of 7 and a temperature of 20° C., the aqueous phase of said suspension having a pH of 3–11, wherein the solid sodium perborate amounts to from 5 to 90% of the weight of the suspended solids and wherein the vinyl polymer amounts to about 1–3% by weight of said stable aqueous suspension.

2. Storage stable aqueous suspension according to claim 1 additionally containing a non-oxidizable surfactant selected from the group consisting of anionic alkyl sulfates and anionic ethylene oxide or propylene oxide addition products of fatty alcohols, alkyl sulfonates, alkyl aryl sulfonates and the condensation products of fatty acids with hydroxy carboxylic acids, hydroxy sulfonic acids, amino carboxylic acids and amino sulfonic acids, all having 8 to 24 carbon atoms in the alkyl or alkyl aryl radical, and nonionic addition products of ethylene oxide and propylene oxied to fatty alcohols, fatty acids, alkyl phenols, fatty acid amides, fatty acid alkylolamides, all having 8 to 24 carbon atoms in the alkyl or alkyl aryl radicals, the number of ethylene glycol radicals present in the molecule being between 4 and 20 and sufficient to give the products turbidity points of at least 20° C., and high molecular weight aminoxides.

3. Storage stable aqueous suspension according to claim 1 additionally containing a non-oxidizable surfactant selected from the group consisting of addition product of 13 moles of ethylene oxide to 1 mole of nonyl phenol, dodecyl dimethyl aminoxide, sodium salt of $C_{12}$–$C_{14}$ alcohol ether sulfate, and sodium salt of an alkyl benzenesulfonate having 12 carbon atoms in the alkyl radical.

4. Storage stable aqueous suspension according to claim 1, additionally containing a stabilizer for the perborate selected from the group consisting of tannic acid, citric acid, barbituric acid, ascorbic acid, acetophenetidine, acetanilide, 8-oxyquinoline, tetrasodium pyrophosphate, sodium polysilicates, and magnesium silicate.

5. Storage stable aqueous suspension according to claim 1 consisting essentially of:
   20% perborate
   10% $Na_5P_3O_{10}$
   1% of a cross linked non-oxidizable vinyl polymer containing carboxyl groups, the 1% aqueous sodium salt solution of which when substantially free of other dissolved materials has a viscosity of 50,000 cp. at a pH of 7 and a temperature of 20° C., and in solution
   10% of the sodium salt of an alkyl ether sulfate which is the sulfatized addition product of 2.5 moles of ethylene oxide to coconut fatty alcohols, and
   59% water.

6. Storage stable aqueous suspension according to claim 1 wherein the 1% aqueous sodium salt solution of said vinyl polymer when substantially free of other dissolved materials has a viscosity of at least 7000 to 100,000 cp. at a pH of 7 and a temperature of 20° C.

7. Storage stable aqueous suspension according to claim 1 wherein the suspended solids amount to from 10 to 30% of the weight of the total suspension.

8. Storage stable aqueous suspension according to claim 1 wherein the solid sodium perborate amounts to from 5 to 50% of the weight of the suspended solids.

9. Storage stable aqueous suspension according to claim 1 wherein the solid sodium perborate amounts to from 10 to 50% of the weight of the suspended solids.

10. Storage stable aqueous suspension according to claim 1 additionally containing at least one sodium salt of a condensed phosphoric acid in suspension.

11. Storage stable aqueous suspension according to claim 10 wherein said sodium salt of a condensed phosphoric acid is a member selected from the group consisting of pyrophosphoric acid and polyphosphoric acid.

12. Storage stable aqueous suspension according to claim 1, said non-oxidizable surfactant being present in an amount of from 5 to 20% by weight of the total suspension.

13. Storage stable aqueous suspension according to claim 1 consisting essentially of:
  30% perborate
  1% of a cross-linked non-oxidizable vinyl polymer containing carboxyl groups, the 1% aqueous sodium salt solution of which when substantially free of other dissolved materials has a viscosity of 50,000 cp. at a pH of 7 and a temperature of 20° C.,
  69% water.

14. Storage stable aqueous suspension according to claim 1 consisting essentially of:
  20% perborate
  10% $Na_4P_2O_7$
  1% of a cross-linked non-oxidizable vinyl polymer containing carboxyl groups, the 1% aqueous sodium salt solution of which when substantially free of other dissolved materials has a viscosity of 50,000 cp. at a pH of 7 and a temperature of 20°C.,
  69% water.

15. Storage stable aqueous suspension according to claim 1 consisting essentially of:
  20% perborate
  10% $Na_2SO_4$
  1% of a cross-linked non-oxidizable vinyl polymer containing carboxyl groups, the 1% aqueous sodium salt solution of which when substantially free of other dissolved materials has a viscosity of 50,000 cp. at a pH of 7 and a temperature of 20° C.,
  69% water.

16. Storage stable aqueous suspension according to claim 1 consisting essentially of:
  20% perborate
  1% of a cross-linked non-oxidizable vinyl polymer containing carboxyl groups, the 1% aqueous sodium salt solution of which when substantially free of other dissolved materials has a viscosity of 50,000 cp. at a pH of 7 and a temperature of 20° C., and in solution
  10% $Na_2CO_3$
  69% water.

17. Storage stable aqueous suspension according to claim 1 consisting essentially of:
  20% perborate
  10% $Na_5P_3O_{10}$
  1% of a cross-linked non-oxidizable vinyl polymer containing carboxyl groups, the 1% aqueous sodium salt solution of which when substantially free of other dissolved materials has a viscosity of 50,000 cp. at a pH of 7 and a temperature of 20° C., and in solution
  10% of a product formed by addition of 13 moles of ethylene oxide to 1 mole of nonyl phenol,
  59% water.

18. Storage stable aqueous suspension according to claim 1 consisting essentially of:
  20% perborate
  10% $Na_4P_2O_7$
  1% of a cross-linked non-oxidizable vinyl polymer containing carboxyl groups, the 1% aqueous sodium salt solution of which when substantially free of other dissolved materials has a viscosity of 50,000 cp. at a pH of 7 and a temperature of 20° C., and in solution
  10% of a product formed by addition of 13 moles of ethylene oxide to 1 mole of nonyl phenol,
  59% water.

19. Storage stable aqueous suspension according to claim 1 consisting essentially of:
  20% perborate
  10% $Na_5P_3O_{10}$
  1% of a cross-linked non-oxidizable vinyl polymer containing carboxyl groups, the 1% aqueous sodium salt solution of which when substantially free of other dissolved materials has a viscosity of 50,000 cp. at a pH of 7 and a temperature of 20° C., and in solution
  10% dodecyl dimethyl aminoxide, and
  59% water.

20. Storage stable aqueous suspension according to claim 1 consisting essentially of:
  20% perborate
  10% $Na_5P_3O_{10}$
  1% of a cross-linked non-oxidizable vinyl polymer containing carboxyl groups, the 1% aqueous sodium salt solution of which when substantially free of other dissolved materials has a viscosity of 50,000 cp. at a pH of 7 and a temperature of 20° C., and in solution
  10% of the sodium salt of an alkyl benzene sulfonate having 12 carbon atoms in the alkyl radical and
  59% water.

References Cited
UNITED STATES PATENTS

| | | | |
|---|---|---|---|
| 2,798,053 | 7/1957 | Brown | 252—89 X |
| 3,393,153 | 7/1968 | Zimmerer et al. | 252—99 X |

MAYER WEINBLATT, Primary Examiner

U.S. Cl. X.R.

252—94, 95, 186